US011320362B2

(12) United States Patent
Ozcan et al.

(10) Patent No.: US 11,320,362 B2
(45) Date of Patent: May 3, 2022

(54) SYSTEM AND METHOD FOR DETERMINING YEAST CELL VIABILITY AND CONCENTRATION

(71) Applicant: THE REGENTS OF THE UNIVERSITY OF CALIFORNIA, Oakland, CA (US)

(72) Inventors: Aydogan Ozcan, Los Angeles, CA (US); Alborz Feizi, Walnut Creek, CA (US); Alon Greenbaum, West Hollywood, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 485 days.

(21) Appl. No.: 16/333,139

(22) PCT Filed: Sep. 22, 2017

(86) PCT No.: PCT/US2017/053079
§ 371 (c)(1),
(2) Date: Mar. 13, 2019

(87) PCT Pub. No.: WO2018/057972
PCT Pub. Date: Mar. 29, 2018

(65) Prior Publication Data
US 2021/0285864 A1 Sep. 16, 2021

Related U.S. Application Data

(60) Provisional application No. 62/399,208, filed on Sep. 23, 2016.

(51) Int. Cl.
*G06K 9/00* (2006.01)
*G01N 15/14* (2006.01)
(Continued)

(52) U.S. Cl.
CPC ..... *G01N 15/1463* (2013.01); *G01N 15/1429* (2013.01); *G01N 15/1434* (2013.01);
(Continued)

(58) Field of Classification Search
CPC .......... G01N 15/1463; G01N 15/1429; G01N 15/1434; G01N 2015/1006;
(Continued)

(56) References Cited

U.S. PATENT DOCUMENTS

2012/0148141 A1\* 6/2012 Ozcan .................. G03H 1/0866
382/133
2012/0157160 A1 6/2012 Ozcan et al.
(Continued)

FOREIGN PATENT DOCUMENTS

WO 2011/156249 A2 12/2011
WO 2016/138041 A2 9/2016
WO 2016/138041 A9 9/2016

OTHER PUBLICATIONS

PCT International Search Report for PCT/US2017/053079, Applicant: The Regents of the University of California, Form PCT/ISA/210 and 220, dated Jan. 29, 2018 (7pages).
(Continued)

*Primary Examiner* — Avinash Yentrapati
(74) *Attorney, Agent, or Firm* — Vista IP Law Group LLP

(57) ABSTRACT

A lens-free microscope system for automatically analyzing yeast cell viability in a stained sample includes a portable, lens-free microscopy device that includes a housing containing a light source coupled to an optical fiber, the optical fiber spaced away several centimeters from an image sensor disposed at one end of the housing, wherein the stained sample is disposed on the image sensor or a sample holder adjacent to the image sensor. Hologram images are transferred to a computing device having image processing
(Continued)

software contained therein, the image processing software identifying yeast cell candidates of interest from back-propagated images of the stained sample, whereby a plurality of spatial features are extracted from the yeast cell candidates of interest and subject to a trained machine learning model to classify the yeast cell candidates of interest as live or dead.

18 Claims, 9 Drawing Sheets

(51) Int. Cl.
  *G06T 7/11* (2017.01)
  *G06K 9/62* (2022.01)
  *G01N 15/10* (2006.01)
(52) U.S. Cl.
  CPC ....... *G06K 9/0014* (2013.01); *G06K 9/00147* (2013.01); *G06K 9/6257* (2013.01); *G06K 9/6269* (2013.01); *G06T 7/11* (2017.01); *G01N 2015/1006* (2013.01); *G01N 2015/1447* (2013.01); *G01N 2015/1454* (2013.01); *G01N 2015/1488* (2013.01); *G06T 2207/10056* (2013.01); *G06T 2207/30164* (2013.01)
(58) Field of Classification Search
  CPC ... G01N 2015/1447; G01N 2015/1454; G01N 2015/1488; G06T 7/11; G06T 2207/10056; G06T 2207/30164; G06K 9/0014; G06K 9/00147; G06K 9/6257; G06K 9/6269
  See application file for complete search history.

(56) References Cited

U.S. PATENT DOCUMENTS

| | | | |
|---|---|---|---|
| 2012/0218379 A1 | 8/2012 | Ozcan et al. | |
| 2012/0248292 A1 | 10/2012 | Ozcan et al. | |
| 2012/0281899 A1 | 11/2012 | Ozcan et al. | |
| 2013/0092821 A1 | 4/2013 | Ozcan et al. | |
| 2013/0157351 A1 | 6/2013 | Ozcan et al. | |
| 2013/0193544 A1 | 8/2013 | Ozcan | |
| 2013/0203043 A1 | 8/2013 | Ozcan et al. | |
| 2013/0258091 A1 | 10/2013 | Ozcan et al. | |
| 2013/0280752 A1 | 10/2013 | Ozcan et al. | |
| 2014/0120563 A1 | 5/2014 | Ozcan et al. | |
| 2014/0160236 A1 | 6/2014 | Ozcan et al. | |
| 2014/0300696 A1 | 10/2014 | Ozcan et al. | |
| 2015/0111201 A1 | 4/2015 | Ozcan et al. | |
| 2015/0153558 A1 | 6/2015 | Ozcan et al. | |
| 2015/0204773 A1* | 7/2015 | Ozcan | G01B 11/24 382/103 |
| 2015/0232906 A1* | 8/2015 | Chan | G01N 21/6428 435/29 |
| 2016/0070092 A1 | 3/2016 | Ozcan et al. | |
| 2016/0161409 A1 | 6/2016 | Ozcan et al. | |
| 2016/0327473 A1 | 11/2016 | Ozcan et al. | |
| 2016/0334614 A1 | 11/2016 | Ozcan et al. | |
| 2017/0153106 A1 | 6/2017 | Ozcan et al. | |
| 2017/0160197 A1 | 6/2017 | Ozcan et al. | |
| 2017/0168285 A1 | 6/2017 | Ozcan et al. | |
| 2017/0220000 A1 | 8/2017 | Ozcan et al. | |
| 2017/0357083 A1 | 12/2017 | Ozcan et al. | |
| 2018/0003686 A1 | 1/2018 | Ozcan et al. | |
| 2018/0052425 A1 | 2/2018 | Ozcan et al. | |
| 2018/0196193 A1 | 7/2018 | Ozcan et al. | |
| 2018/0373921 A1 | 12/2018 | Di Carlo et al. | |

OTHER PUBLICATIONS

PCT Written Opinion of the International Search Authority for PCT/US2017/053079, Applicant: The Regents of the University of California, Form PCT/ISA/237, dated Jan. 26, 2018 (10pages).

Bishara, Waheb et al., Lensfree on-chip microscopy over a wide field-of-view using pixel super-resolution, May 24, 2010, vol. 18, No. 11, Optics Express 11181-11191.

Bishara, Waheb et al., Holographic pixel super-resolution in portable lensless on-chip microscopy using a fiber-optic array, Lab Chip, 2011, 11, 1276-1279.

Coskun, Ahmet F. et al., Wide field-of-view lens-free fluorescent imaging on a chip, Lab Chip, Apr. 7, 2010, 10(7):824-827, doi:10.1039/b926561a.

Greenbaum, Alon et al., Wide-field computational color imaging using pixel super-resolved on-chip microscopy, May 20, 2013, vol. 21, No. 10, DOI:10.1364/OE.21.012469, Optics Express 12469-12483.

Greenbaum, Alon et al., Field-Portable Pixel Super-Resolution Colour Microscope, PLOS ONE, www.plosone.org., Sep. 2013, vol. 8, Issue 9, e76475-e76475.

Hong, Dongpyo et al., Fast automated yeast cell counting algorithm using bright-field and fluorescence microscopic images, Biological Procedure Online 2013, 15:13, http://www.biologicalproceduresonline.com/content/15/1/13.

Lee, Myungjun et al., Filed-portable reflection and transmission microscopy based on lensless holography, Sep. 1, 2011, vol. 2, No. 9, Biomedical Optics Express, 2721-2730.

Mudanyali, Onur et al., Compact, light-weight and cost-effective microscope based on lensless incoherent holography for telemedicine applications, Lab Chip, 2010, 10, 1417-1428.

PCT International Preliminary Report on Patentability (Chapter I of the Patent Cooperation Treaty) for PCT/US2017/053079, Applicant: The Regents of the University of California, Form PCT/IB/326 and 373, dated Apr. 4, 2019 (12pages).

* cited by examiner

SYSTEM AND METHOD FOR DETERMINING YEAST CELL VIABILITY AND CONCENTRATION

RELATED APPLICATION

This Application is a U.S. National Stage filing under 35 U.S.C. § 371 of International Application No. PCT/US2017/053079, filed Sep. 22, 2017, which claims priority to U.S. Provisional Patent Application No. 62/399,208 filed on Sep. 23, 2016, which are hereby incorporated by reference. Priority is claimed pursuant to 35 U.S.C. §§ 119, 371 and any other applicable statute.

TECHNICAL FIELD

The technical field generally relates to devices and methods for imaging small objects. More specifically, the technical field relates to a system and method for imaging and analyzing yeast cell viability and concentration.

BACKGROUND

Yeast cells are frequently used in alcoholic beverage and baking industry to make products such as beer, wine, and bread. Yeast is also used in other commercial endeavors such as biofuel production. Monitoring the concentration and viability of these yeast cells allows for fine-tuning of fermentation parameters, which is crucial for both research laboratories and for practical industrial application. Current methods of yeast viability testing are time-consuming and require expensive equipment. The most common method is to use a hemocytometer together with a bench-top microscope which are used to manually identify cells in a stained sample. The procedure relies on the enumeration of cells within a specific number of microscopic fields to determine the concentration of yeast in a population. This method is tedious and time-consuming and the use of a lateral mechanical scanning stage is highly recommended to achieve high accuracy with this method. Of course, the incorporation of a lateral mechanical scanning stage increases the overall footprint and cost of the system.

Alternatively, flow cytometers can be used to quickly assess the viability of yeast cells. However, this method also demands relatively expensive and bulky equipment (i.e., the flow cytometer), and typically requires a technician to operate. More recently, imaging cytometry systems have made the counting process automatic by combining fluorescence and bright-field imaging modalities and applying automatic counting algorithms. For example, International Patent Publication No. WO 2011/156249 discloses a Cellometer® Vision platform that utilizes one bright-field and two fluorescence channels to perform cytometric analysis. However, such systems are also relatively costly and bulky due to the need for lenses and motorized hardware assemblies. Smaller establishments such as home-brewers, small breweries, restaurants, and consumers do not typically have access to such equipment even though there is a need to quantify the viability of yeast cells.

SUMMARY

According to one aspect of the invention, a method for automatically analyzing yeast cell viability in a stained sample includes loading the stained sample in a portable, lens-free microscopy device (sometimes referred to herein as the Automatic Yeast Analysis Platform (AYAP)) that comprises a housing containing a light source at one end and an image sensor disposed at another end of the housing, wherein a stained sample is disposed on the image sensor or a sample holder disposed adjacent to the image sensor. The stained sample is illuminated with the light source and a hologram image of the stained sample is captured with the image sensor. The captured hologram image is transferred to a computing device operatively connected to the lens-free microscopy device, the computing device having image processing software loaded therein for automatically analyzing yeast cell viability. The image processing software automatically analyzes yeast cell viability by (i) dividing the full hologram image field-of-view into a plurality of smaller tiled field-of-views, (ii) back-propagating the tiled field-of-views to a plurality of distances ($z_2$) from the image sensor, (iii) identifying yeast cell candidates at each $z_2$ distance and inputting yeast cell candidates into a pre-trained machine learning model (which in one embodiment is a Support Vector Machine (SVM) model) to generate a mean classification score for the tiled field-of-views as well as classifying the yeast cell candidates as stained or unstained by a classification score; (iv) selecting, for each tiled field-of-view, the distance $z_2$ with the largest mean classification score; (v) identifying the stained and unstained yeast cells in the selected tiles from (iv) for the full hologram image field-of-view. When the model being used is the SVM model, the classification score is the SVM classification score.

In another embodiment, a method for automatically analyzing yeast cell viability in a stained sample includes loading the stained sample in a portable, lens-free microscopy device that comprises a housing containing a light source at one end and an image sensor disposed at another end of the housing, wherein a stained sample is disposed on the image sensor or a sample holder disposed adjacent to the image sensor. The stained sample is illuminated with the light source and capturing a hologram image of the stained sample with the image sensor. The captured hologram image is transferred to a computing device operatively connected to the lens-free microscopy device, the computing device having image processing software loaded therein for automatically analyzing yeast cell viability. The image processing software automatically analyzes yeast cell viability by (i) dividing the full hologram image field-of-view into a plurality of smaller tiled field-of-views, (ii) back-propagating each of the tiled field-of-views to pre-stored distances ($z_2$) from the image sensor obtained in an auto-focus operation, (iii) inputting yeast cell candidates from the tiled field-of-views into a pre-trained machine learning model (e.g., a Support Vector Machine (SVM) model) to generate classification scores (e.g., SVM classification scores) for the yeast cell candidates, (iv) identifying the stained and unstained yeast cells in the tiled field-of-views for the full hologram image field-of-view based on the classification scores.

In yet another embodiment, a lens-free microscope system for automatically analyzing yeast cell viability in a stained sample includes a portable, lens-free microscopy device comprising a housing containing a light source coupled to an optical fiber, the optical fiber spaced away several centimeters from an image sensor disposed at one end of the housing, wherein the stained sample is disposed on the image sensor or a sample holder disposed adjacent to the image sensor; and a computing device having image processing software contained therein, the image processing software identifying yeast cell candidates of interest from back-propagated images of the stained sample, whereby a plurality of spatial features are extracted from the yeast cell candidates of interest and subject to a trained machine learning model to classify the yeast cell candidates of interest as live or dead.

In one embodiment, the AYAP features a lens-free on-chip microscope that weighs approximately 70 grams and has dimensions of around 4×4×12 cm, thus making the same portable. The lens-free setup uses a light-emitting diode (LED) coupled to a multimode optical fiber (core size: 0.1 mm) and a band-pass optical filter, outputting partially-coherent light that illuminates the sample. A complementary metal oxide semiconductor (CMOS) image sensor chip captures the holographic shadows of the sample, which are sent to software for automated analysis, running on a computing device such as a tablet-PC. The software, which can be accessed with a graphical user interface (GUI), reconstructs an image of the object plane using these holographic shadows and is input to a pre-trained machine-learning model to rapidly identify live and dead cells in the stained sample. Any number of stains may be used for the yeast cells. An example of one such stain is methylene blue which is stable at room temperature, making it ideal for the portable platform. The AYAP rapidly captures and analyses a large imaging field-of-view (FOV) of ~22.5 mm$^2$, allowing for the analysis of an order of magnitude larger sample area compared to a conventional 10× microscope objective-lens.

The platform enables the automated measurement of cell viability using a machine learning algorithm implemented on lens-free reconstructed images of color-stained cells and demonstrates the success of this computational approach in measuring the viability and concentration of *Saccharomyces cerevisiae*—the most common yeast species used in the food, alcoholic beverage, and biofuel industries. There exist many strains within this species with very similar morphology and size. For the experiments described herein, the Distillers Active Dry Yeast of the *Saccharomyces cerevisiae* was selected due to its wide-scale use in various applications and industries. It should be appreciated, however, that the platform described herein may be used with any type of yeast cell. By varying the viability and concentration of these yeast cells in experiments, AYAP's performance was compared with fluorescence exclusion staining using regression analysis. No significant difference was found between the two methods within a large concentration range of 0.14 million to 1.4 million cells per milliliter, validating the accuracy of yeast viability and concentration analysis performed using the platform described herein. This lightweight, compact and cost-effective platform will be useful for rapid and accurate quantification of cell viability and concentration without the need for bulky and expensive equipment.

DETAILED DESCRIPTION OF THE ILLUSTRATED EMBODIMENTS

Figure 1:
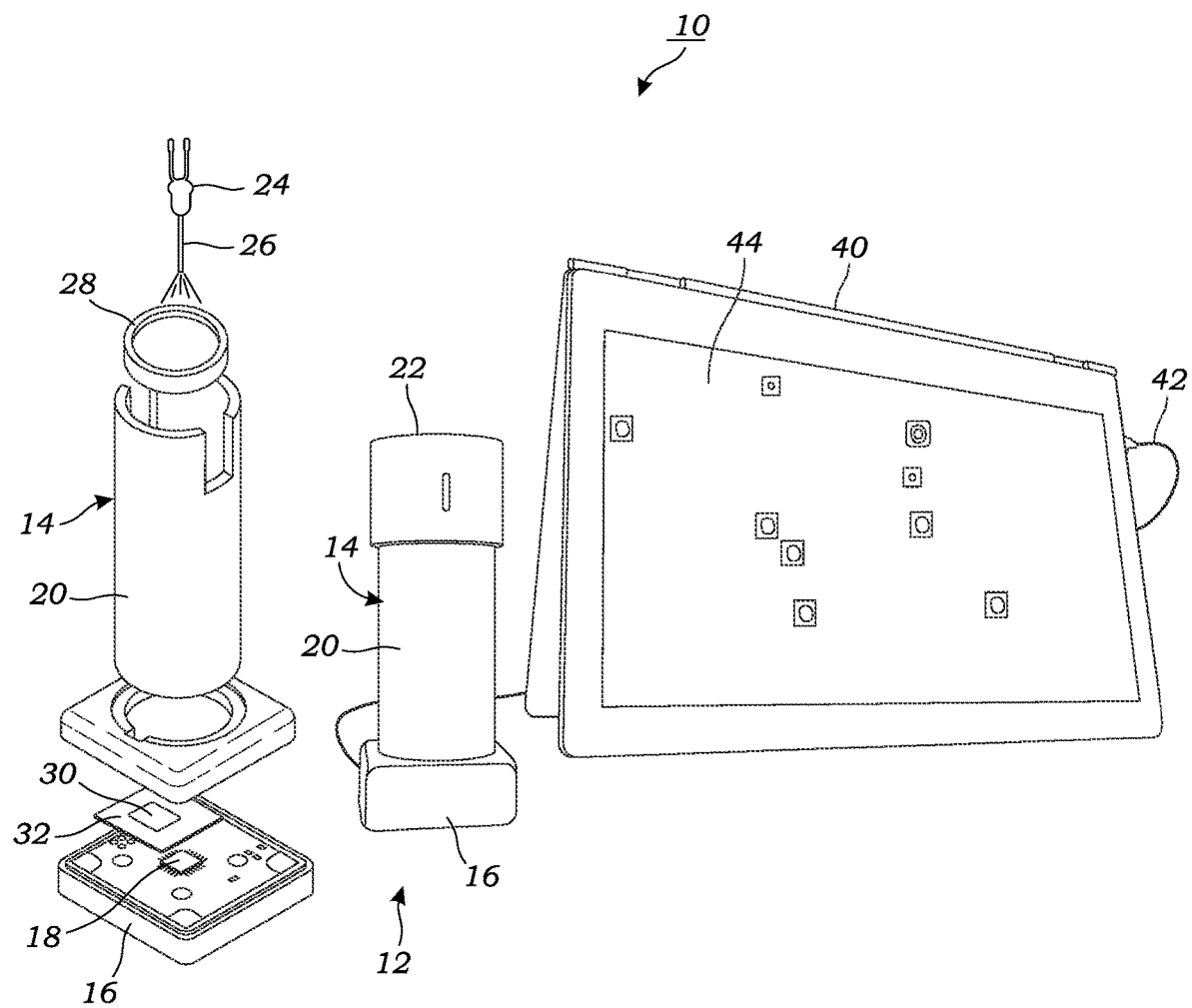
FIG. 1 illustrates a schematic representation of the microscope system according to one embodiment. The lens-free microscope is illustrated along with a computing device that is used by the user to automatically analyzing yeast cell viability in a stained sample. An exploded view of the lens-free microscope is also illustrated.

FIG. 1 illustrates a lens-free microscope system 10 according to one embodiment of the invention. The lens-free microscope system 10 includes a lens-free microscope 12 that is used to obtain images of a stained sample that contains yeast cells therein. The lens-free microscope includes a housing 14 that holds the components of the lens-free microscope 12. As seen in FIG. 1, the housing 14 includes a lower portion or base 16 that holds an image sensor 18. The image sensor 18 may include, in some embodiments, a CMOS image sensor although other types of image sensors may also be used (e.g., CCD based opto-electric sensor array). The housing 14 includes an extension 20 that extends away from the base 16 and defines inside a free space optical path. The housing 14 includes an upper portion or cap 22 that includes a light source 24 that is coupled to a multi-mode optical fiber 26. The light source 24 may include a light emitting diode (LED) emitting light at a defined or certain central wavelength that, when actuated, transmits light to the optical fiber 26. The light source 24 may also include a laser diode of a certain wavelength. The light source 24 may also include a group of multiple LEDs or laser diodes emitting light at different wavelengths. Light that exits the optical fiber 26 passes through an optional optical bandpass filter 28 and continues on through the free space optical path in the extension 20 and onto a sample 30. The optical bandpass filter 28 improves the temporal coherence of the illumination light at the image sensor plane but is optional in some embodiments. The extension 20 creates a distance between the end of the optical fiber 26 at which the light exits and the surface of the image sensor 18. In the embodiment used for experiments described herein, this distance is about six inches. Power to the light source 24 may include a battery (not shown) that is also contained within the housing 14. The housing 14 may be made from a lightweight, yet durable material such as commonly used plastics or other polymer material. The housing 14 used for the experiments was 3D printed using acrylonitrile butadiene styrene and weighed approximately 70 grams including all components therein.

In one embodiment, the sample 30 is held on or within an optically transparent sample holder 32. For example, a liquid sample 30 that contains the stained yeast cells to be imaged is placed between two coverslips that define a small volume or chamber between the two coverslips where the sample is held. The sample holder 32 is placed, in one embodiment, directly on the active surface if the image sensor 18 so that the lower coverslip directly rests on the image sensor 18. In another embodiment, the sample holder 32 may be omitted entirely and the sample containing the stained yeast cells is placed directly on the active surface of the image sensor 24. Any number of types of stains may be used. In experiments used herein, methylene blue was used. Methylene blue is used to identify live yeast cells; live cells are unstained while dead cells are stained by the methylene blue dye.

Still referring to FIG. 1, a computing device 40 is illustrated being connected to the lens-free microscope 12. The computing device 40 may include desktop computer, laptop computer, tablet computer, or mobile phone (e.g., Smartphone). The lens-free microscope 12 may be connected to the computing device 40 using a cable 42 (e.g., USB cable) that may be used to control the lens-free microscope 12 and transmit image files obtained of the sample. Alternatively, lens-free microscope 12 may be connected to the computing device 40 wirelessly using, for example, a Bluetooth, near field communication (NFC), Wi-Fi, or the like. The computing device 40 may be located locally with the lens-free microscope 40 or the computing device 40 may be located remotely from the lens-free microscope 40. The computing device 40 includes one or more processors that are used to execute image processing software 42. As explained in more detail herein, the image processing software 42 is used to process the raw hologram images of the sample that contains candidate stained yeast cells and back-propagate images to one or more z planes (distance from active surface of the image sensor 18) in an auto-focus operation. The image processing software also identifies candidate of yeast cells in the back-propagated images using morphological identification and thresholding and extracts spatial features of the candidate yeast cells which are input into a trained machine learning model to classify the yeast cell candidates of interest as live or dead.

Figure 2A:
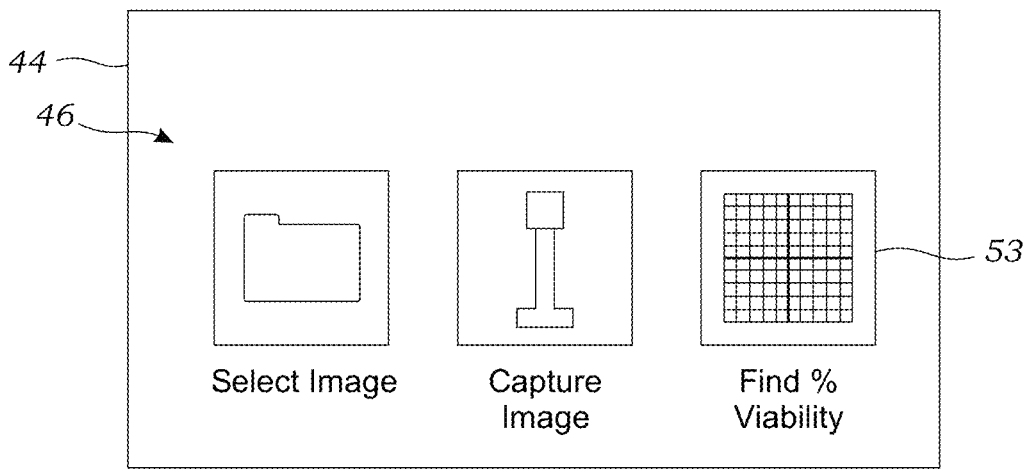
FIG. 2A illustrates a GUI that displays a main menu for the Automatic Yeast Analysis Platform (AYAP). The user has the ability to capture a hologram directly using the lens-free microscope or load a previously captured hologram.
Figure 2B:
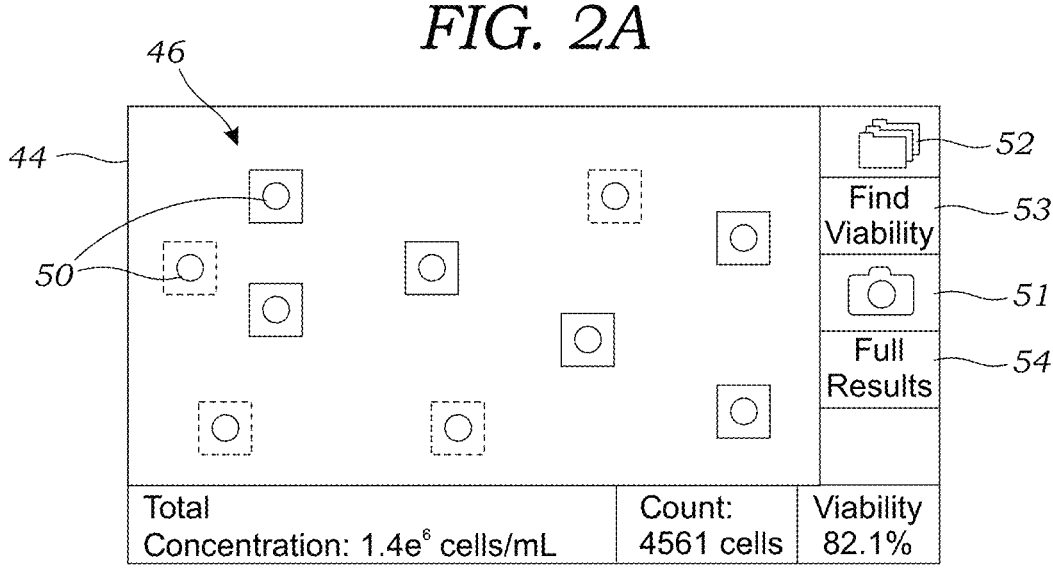
FIG. 2B illustrates another screen shot of the GUI that displays labelled yeast cells to the user. The labels identify yeast cells that are stained as well as yeast cells that are unstained. Key data such as total concentration, cell count, and cell viability are also displayed to the user on the bottom of the display. A user can digitally zoom into each cell in order to inspect every labeled candidate cell.
Figure 2C:
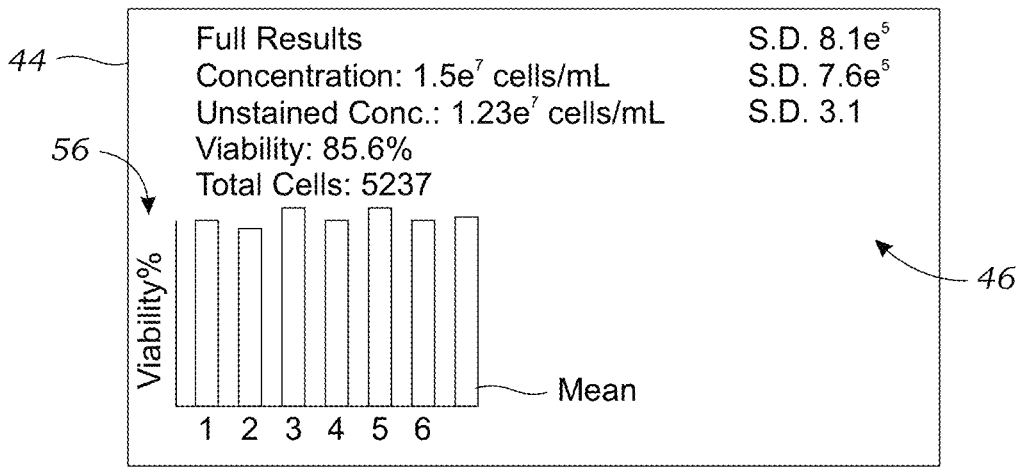
FIG. 2C illustrates another screen shot of the GUI that displays the Full Results data. This also includes a graph showing results on a per tile basis as well as the mean value for the entire FOV. The Full Results screen also illustrates standard deviations.

The computing device 40 includes or is associated with a display 44 that contains a graphical user interface (GUI) 46 that is used to run samples, analyze data, and display results to the user (see FIGS. 2A-2C). In some embodiments, the GUI 46 provides the user to zoom or pan over the image of the back-propagated images as well as see results of the entire sample or sub-regions of the overall field-of-view. In some embodiments, the GUI 46 is implemented on a touch screen so that the user interacts by depressing his or her fingers, stylus, or the like on the screen to select various software options. As seen in FIG. 2B, the yeast cell candidates 50 that are displayed in the GUI 46 may be tagged, marked, or colored to identify their respective classification by the image processing software 42. In this particular example, solid boxes represent unstained candidates 50 while dashed boxes represent stained candidates 50. Of course, different color markers may be used to identify stained yeast cells and unstained yeast cells. As best seen in FIG. 2A, in the opening menu of the software 42, the GUI 46 permits the user to run a new test or retrieve the results of a previously stored test. The GUI 46 includes a camera button 51 that is used to acquire a hologram image of the sample 30. Alternatively, the GUI 46 offers the user to ability to open up a previously saved file using folder button 52. The GUI further includes a "Find Viability" button 53 that when depressed analyzes the full field-of-view to determine the viability percentage which is also displayed to the user on the bottom of the GUI 46. As seen in FIG. 2B, the user also can touch the "Full Results" button 54 that provides even more results including a breakdown of the tiles or sub-FOVs that are used in the auto-focusing aspect of the image processing operation (described in more detail below).

For example, as seen in FIG. 2C, the user is given the concentration of cells as well as the standard deviation (s.d.). Also presented is the unstained concentration of cells as well as the standard deviation. The viability % is also presented along with its standard deviation. The total number of cells is also provided to the user. Also illustrated in FIG. 2C includes a graph 56 showing the viability % for each sub-FOV (in this example there are six such tiles) as well as the overall mean across all tiles (i.e., the entire FOV). Similar per-tile graphs for unstained concentration, total concentration, etc. may also be displayed in the Full Results screen.

Figure 3:
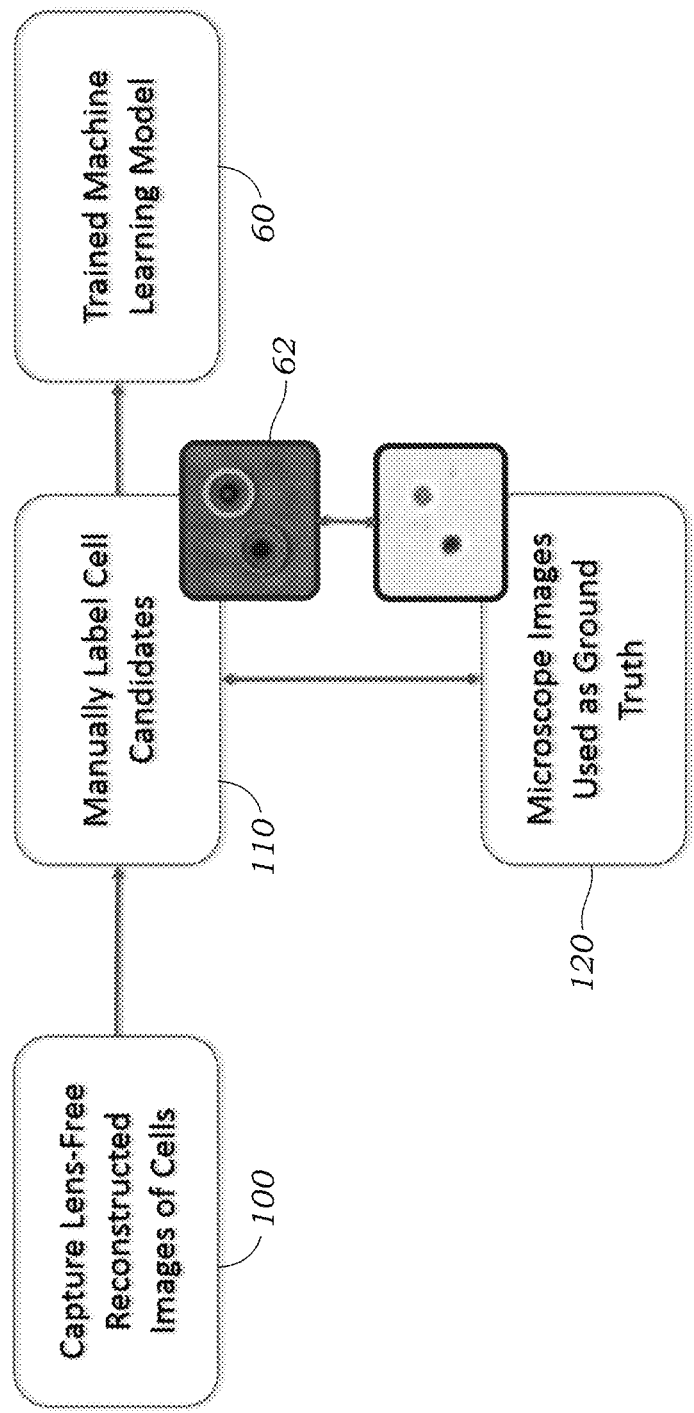
FIG. 3 illustrates a sequence of operations used to train the machine learning model according to one embodiment.
Figure 6:
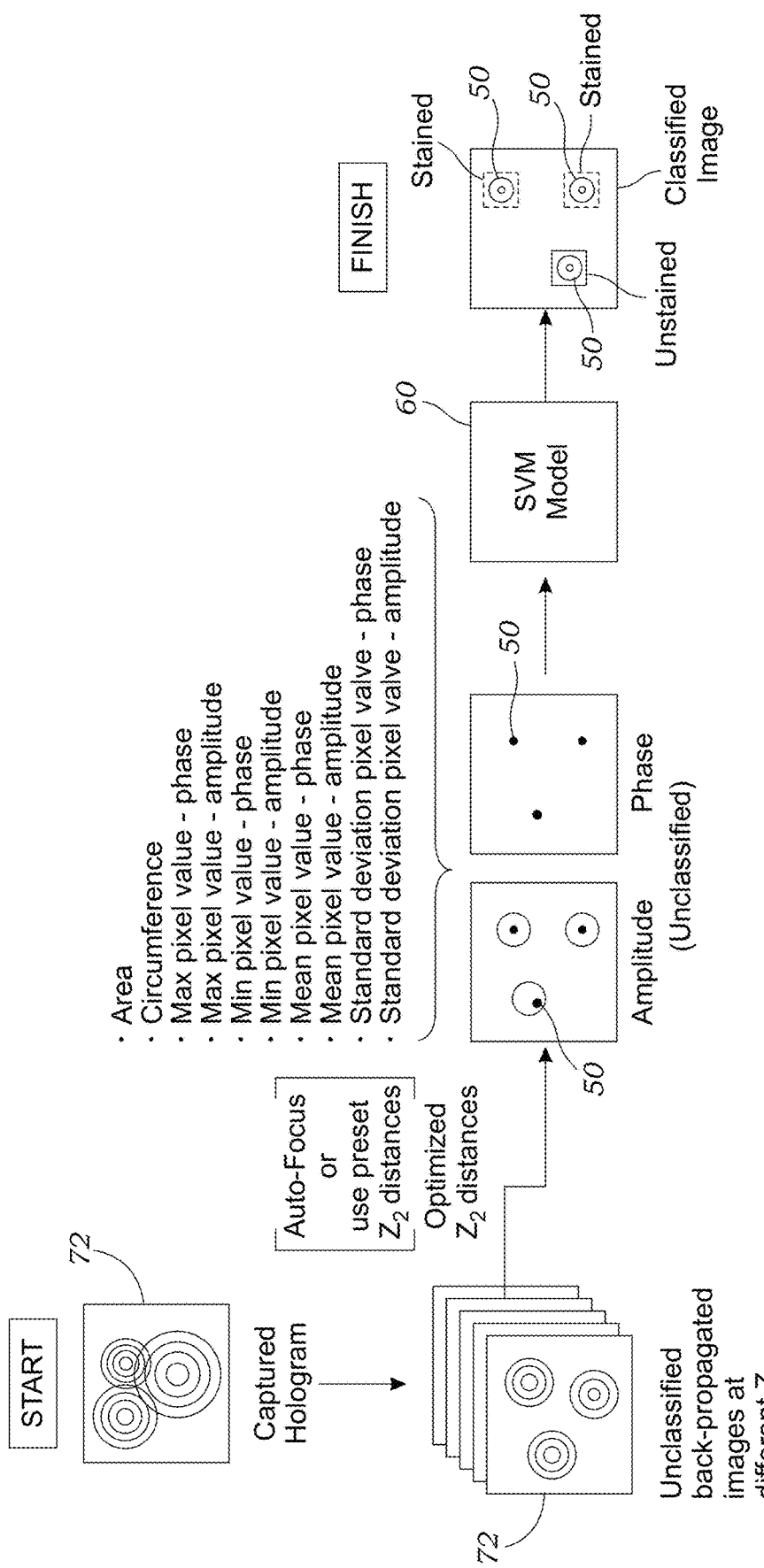
FIG. 6 illustrates a sequence of operations that is used to analyze the viability of yeast cells in an unknown sample. A hologram image is captured which may be divided into sub-FOVs as explained herein in some embodiments. The hologram image or sub-FOVs are then back-propagated to different $z_2$ distances. For each sub-FOV, an optimized $z_2$ distance is chosen. Ten (10) spatial parameters from the reconstructed amplitude and phase images are then input into a trained SVM model which automatically classifies candidate yeast cells as being stained or unstained in each sub-FOV. This process is repeated for all sub-FOVs. A classified image can then be presented to the user and is used to calculate viability, cell counts, concentrations, and the like which can be presented to the user.

The image processing software 42 that is used to automatically classify candidate yeast cells 50 as stained (dead) or unstained (live) utilizes a trained machine learning model 60 as seen in FIGS. 3 and 6. The trained machine learning model 60, in one embodiment, is a trained Support Vector Machine (SVM) model 60 that is used to classify each of the yeast cell candidates 50 as stained or unstained based on a plurality of spatial features that are extracted from the back-propagated images. It should be appreciated that other machine learning models 60 may be used other than the SVM model 60. In one embodiment, as best seen in FIG. 6, the SVM model 60 uses ten (10) spatial features extracted from the back-propagated images of each yeast cell candidate including: area, perimeter or circumference, maximum pixel value on the phase image, maximum pixel value on the amplitude image, minimum pixel value on the phase image, minimum pixel value on the amplitude image, mean pixel value on the phase image, mean pixel value on the amplitude image, standard deviation of the pixel values on the phase image, and the standard deviation of the pixel values on the amplitude image.

To generate the SVM model 60, training data that included known cells that were stained and unstained populated the model as seen in FIG. 3. For example, for the experimental results described herein, the training data was populated from two experiments wherein 260 stained and 260 unstained cells were subject to lens-free image capture and reconstruction as seen in operation 100. Next, the cells were manually identified on the back-propagated reconstructed digital hologram in operation 110 and individually confirmed using a high-resolution bench-top microscope (Olympus BX51, 10× objective lens with 0.3NA, and Retiga 2000R CCD camera) as the ground truth as seen in operation 120. This trained data was then fed to the SVM model 60.

Figure 4:
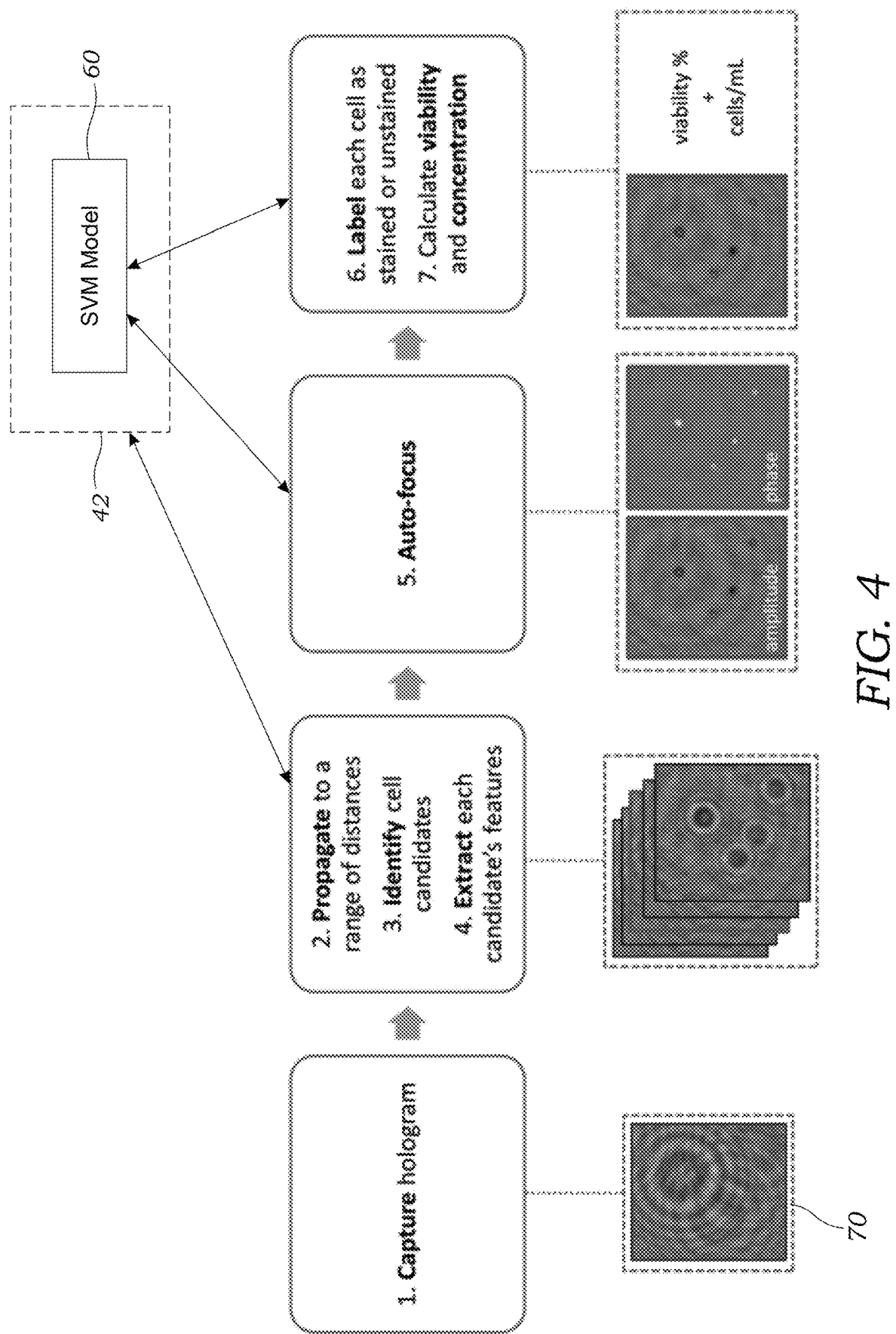
FIG. 4 illustrates the sequence of operations in the image processing and machine-learning algorithm according to one embodiment.
Figure 5:
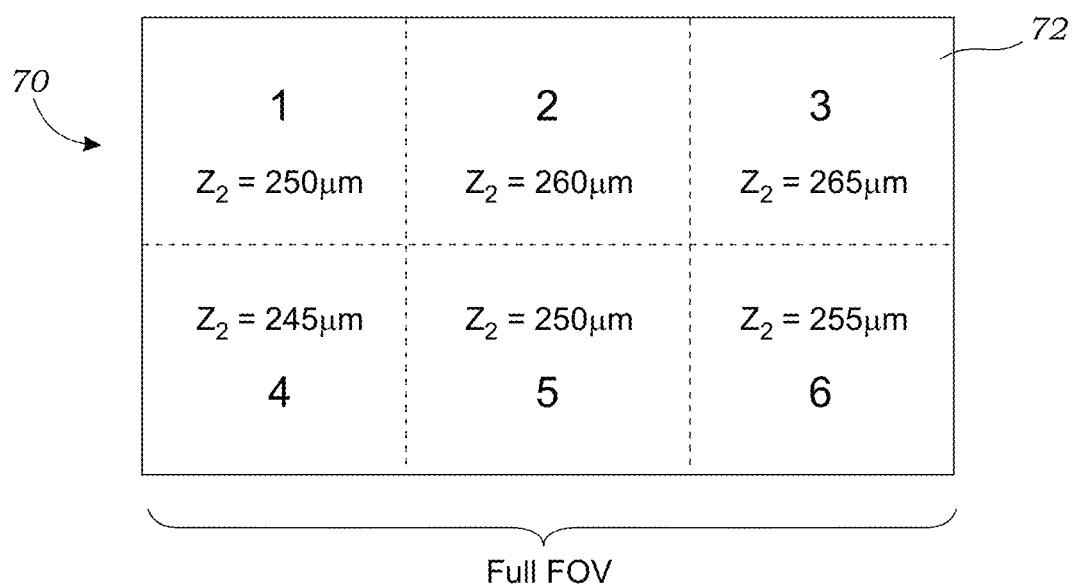
FIG. 5 illustrates a schematic representation of a captured hologram illustrating the full FOV along with a plurality of tiles or sub-FOVs that are used in the image processing algorithm.

FIGS. 4 and 6 illustrates a schematic illustration of the operations involved in the method for automatically analyzing yeast cell viability in a stained sample. With reference to FIGS. 4 and 6, a sample 30 is loaded in the lens-free microscope 12. The sample 30 may be located on or in a sample holder 32 or it may be deposited directly on the image sensor 18. A hologram image 70 of the sample 30 is obtained. The hologram image 70 of the sample 30, in one embodiment, is divided into a plurality of tiles 72 or sub-FOVs that together collectively define the full FOV of the image as seen in FIG. 5. The hologram image 70 is divided into tiles 72 with each tile 72 or sub-FOV processed individually. By dividing the full image into sub-FOVs 72 helps minimize the effects of (1) the possible tilting or misalignment of the sample holder 32 with respect to the image sensor 18 plane, and (2) variances in the thickness of the sample holders 32. In one aspect of the invention, there the full FOV image is divided into six (6) or less sub-FOVs. FIG. 5 illustrates a representative image with a full FOV that is divided into six (6) tiles 72 or sub-FOVs.

The sub-FOV holograms are then back-propagated to a range of distances ($z_2$) from the plane of the image sensor 18. This may occur sequentially or in parallel. For each of the back-propagated images, yeast cell candidates 50 are identified using intensity thresholding and mathematical morphology operations. For each of the yeast cell candidates 50, the ten (10) spatial features described above are extracted from the amplitude and the phase images (best seen in FIG. 6). Next, after an auto-focusing operation that is used to identify the optimum or $z_2$ distance for each of the sub-FOVs or tiles, the trained SVM model 60 is used to classify each of the yeast cell candidates 50 as stained or unstained. Each classification also results in a classification score that is associated with that particular yeast cell candidate 50, which represents the signed distance from the decision boundary that decides whether the yeast cell candidate 50 is stained or unstained. As noted above, each of the tiles 72 or sub-FOV holograms were back-propagated to a range of distances. For each tile 72 or sub-FOV a single distance $z_2$ is chosen as the "focused" image plane from which the classifications are used for that particular tile or sub-FOV. Each sub-FOV or tile 72 may have its own optimum $z_2$ distance that is different from neighboring tiles 72 or sub-FOVs. To this end, the propagation distance with the largest mean absolute classification score is chosen as the optimal $z_2$ distance, and this "focused" back-propagated image is used for labelling and viability calculations with the same SVM model 60. FIG. 5, for example, illustrates different $z_2$ distances that are used for each sub-FOV or tile 72. The yeast cells 50 that are classified into unstained (i.e., live) and stained (i.e., dead) are then virtually labelled using a tag, maker, or the like and displayed to the user as seen in FIG. 2B. Finally, viability percentage and the concentration are calculated based on the number of labelled unstained and stained cells. Viability is expressed as a percentage while concentration is expressed as the number of cells per unit volume (e.g., cells/mL).

In the embodiment described above, the auto-focusing operation for each tile 72 or sub-FOV is performed prior to labeling and viability calculations. In another embodiment, the image processing software 42 may already contain the optimum or ideal distances $z_2$ for each tile 72 of sub-FOV. For example, with reference to FIG. 5, the $z_2$ identified for each tile 72 or sub-FOV is used for later measurements. This may be useful, for instance, if the same sample holder 32 is used for successive samples 30, the auto-focusing may only need to be performed once with the optimum or ideal distances $z_2$ being saved for later use. For example, the full auto-focus operation may be performed for the initial test and the distances $z_2$ for each tile or sub-FOV may be stored for later retrieval and use. This use of stored $z_2$ can greatly improve the processing time used for automatically labelling candidate yeast cells 50. For example, on a tablet PC, the entire operation may be performed in around 30 seconds. In comparison, for runs that perform full auto-focusing, the entire analysis time may take between about 5-10 minutes to run each test.

In one preferred embodiment, prior to final labeling of candidate cells 50 as either labeled or unlabeled, a thresholding operation is performed to remove spurious or phantom candidate cells 50 that are clumps, dust particles, and twin-image artifacts in the image. These are removed based comparing the SVM classification score against a threshold value or distance from the decision boundary. Most of these micro-objects lie close to the decision boundary and have the lowest absolute SVM classification scores. An SVM score threshold was determined in order to exclude some of these false classifications from our viability calculations. The number of cell candidates eliminated based on this SVM classification score threshold is approximately 15% of the total number of yeast cell candidates 50 in a given FOV. These cell candidates 50 falling below the threshold cutoff are eliminated from consideration. The remaining cells 50 are classified into stained and unstained cell categories based on their SVM classification scores are accordingly labelled on the reconstructed image Experimental A lens-free microscope system 10 was tested to demonstrate how a compact and cost-effective microscope imaging platform can be used to rapidly measure yeast cell concentration and viability. The system was given the name Automatic Yeast Analysis Platform (AYAP), which is based on digital in-line holography and on-chip microscopy and rapidly images a large field-of-view of 22.5 mm². The lens-free microscope weighs ~70 grams and utilizes a partially-coherent illumination source and an opto-electronic image sensor chip. A touch-screen user interface based on a tablet-PC was developed to reconstruct the holographic shadows captured by the image sensor and use a support vector machine (SVM) model to automatically classify live and dead cells in a yeast sample stained with methylene blue.

Materials and Methods

Sample Preparation

Distillers Active Dry Yeast (DADY) was rehydrated in distilled water. 1:1 volume of 0.1% w/v Methylene Blue was added to the yeast solution to stain the dead cells (i.e., dead cells exhibit a dark stain). The microfluidic counting chamber that was used consists of two coverslips and an adhesive tape (CS Hyde, 45-3A-1) used as a spacer between the two coverslips. In order to build the microfluidic chamber, adhesive tape was cut in the shape of a square and was attached to a coverslip (0.13-0.17 mm thickness). Before adding the yeast solution to the chamber, a second coverslip was placed on top of the adhesive tape, with a small opening at the edge. The sample was slowly injected into the microfluidic chamber through the small opening. The yeast solution disburses through the chamber via capillary action, allowing uniform distribution of the yeast cells within the imaging FOV. Lastly, the top cover slip was slid to close the small opening and to prevent evaporation.

Design of the Field-Portable Lens-Free Microscope

The sample on the coverslip holder was directly placed on top of a CMOS image sensor chip (ON Semiconductor, MT9J003STM) with a pixel size of 1.67 μm. An LED with a peak wavelength of 590 nm (Kingbright, WP7113SYC/J3) was used as the illumination source. Of course, other wavelengths may also be used. A hole was drilled into the lens of the LED using a 300 μm-diameter drill bit. A multimode fiber (100 μm core diameter, Thorlabs, AFS-105/125Y) was inserted into the drilled hole and fixed using optical glue. The beam exiting the optical fiber passes through a band-pass filter (4 nm bandwidth, centered around 590 nm, Thorlabs, FB590-10) to improve the temporal coherence of the illumination light at the image sensor plane. The distance between the cleaved end of the optical fiber and the image sensor is approximately 6 cm. A 3V coin battery powers the LED. All the components fit within a 3D printed housing (3D printer: Stratasys, Dimensions Elite) made using acrylonitrile butadiene styrene (ABS) material.

Hologram Reconstruction

The captured holograms of the sample are back-propagated to the object plane using the angular spectrum method. The angular spectrum method is a technique for modeling the propagation of a wave field and involves expanding a complex wave field into a summation of an infinite number of plane waves. The hologram is first transformed to the spatial frequency domain using a fast Fourier transform (FFT). Then a phase factor, which is a function of the wavelength, propagation distance, and refractive index of the medium, is multiplied with the angular spectrum. Finally it is inverse-Fourier-transformed to the spatial domain to obtain the back-propagated image of the specimen. For cell viability analysis, the image reconstruction method did not perform any additional phase retrieval or twin image elimination routines, although these could also be used for refinement of the reconstructed images, if needed.

Automated Counting and Labelling of Imaged Cells Using Machine-Learning

A SVM-based machine-learning algorithm was used to classify stained and unstained cells from a reconstructed digital hologram and quantify cell viability and concentration. The SVM model that was used was based on ten (10) spatial features extracted from each cell candidate: area, perimeter or circumference, maximum pixel value on the phase image, maximum pixel value on the amplitude image, minimum pixel value on the phase image, minimum pixel value on the amplitude image, mean pixel value on the phase image, mean pixel value on the amplitude image, standard deviation of the pixel values on the phase image, and the standard deviation of the pixel values on the amplitude image. The training data was populated from two experiments, where 260 stained and 260 unstained cells were manually identified on the reconstructed digital hologram and individually confirmed using a high-resolution benchtop microscope (Olympus BX51, 10× objective lens with 0.3NA, and Retiga 2000R CCD camera) as ground truth. In order to validate the predictive capabilities of this library, 5-fold cross-validation was performed. Based on this cross-validation, it was found that the percentage of unstained cells correctly identified was 96.5%, the percentage of stained cells correctly identified was 96.9%, the percentage of unstained cells falsely identified as stained was 3.1%, and finally the percentage of stained cells falsely identified as unstained was 3.5%.

The image processing and cell classification algorithm digitally divides the full-FOV hologram into six tiles (each with a FOV of ~3.8 mm²—see FIG. 5) and processes each sub-FOV individually, which helps to minimize the effects of (1) the possible tilting or misalignment of the sample chamber with respect to the sensor chip plane, and (2) variances in the thickness of the sample holders. The algorithm performs digital auto-focusing at each sub-FOV using the trained machine-learning library. In order to do so, the acquired digital holograms were reconstructed at multiple distances ($z_2$) from the image sensor. Next, the cell candidates are identified at each $z_2$ distance using thresholding and mathematical morphology operations and fed into the trained SVM model (i.e., SVM model 60 in FIG. 4) for classification. A SVM classification score $s_i$ (i=1, . . . , N) which refers to the signed distance from our decision boundary is calculated for each cell candidate in a given tile, where N is the total number of cell candidates. The distance with the largest mean absolute classification score is chosen as the optimal $z_2$ distance for that specific sub-FOV, i.e.:

$$\mathrm{argmax}_{z_2} f(z_2) = \frac{\sum_{i=1}^{N} |s_i|}{N} \quad (1)$$

This focus criterion described above is also used to select the reconstructed image at the optimal $z_2$ distance for labelling and cell viability calculations using the same trained classifier. Next, among all the cell candidates within a given sub-FOV, the majority of clumps, dust particles, and twin-image related artifacts are removed based on an SVM classification score threshold. Most of these non-cell micro-objects lie close to the decision boundary (i.e., boundary separating a cell being classified as stained or unstained) and have the lowest absolute classification scores. An SVM score threshold was determined in order to exclude some of these false classifications from the viability calculations. The number of cell candidates eliminated based on this SVM classification score threshold is approximately 15% of the total number of cell candidates in a given FOV. The remaining cells that are classified into stained and unstained cell categories based on their SVM classification scores were accordingly labelled using color markings on the reconstructed image and the viability percentage of the entire FOV is calculated by dividing the number of unstained cells by the total number of cells. FIG. 2B illustrates a screen shot from the GUI that shows similar labeling of cells and computations being performed on the sample. Finally, the concentration is calculated by dividing the number of identified cells by the sample volume (~4.5 µL) that is analyzed by the imaging system.

Touch-Screen Graphical User Interface (GUI)

A custom-designed touch-screen interface based on a tablet-PC (Lenovo Yoga 2, Intel Core i7, 8 GB RAM) was created to work with the field-portable lens-free microscope. This interface allows the user to load a previously captured sample hologram or directly capture a new hologram using the field-portable microscope, automatically setting the image capture settings. For example, as seen in FIG. 2A, the user has the option to select a prior image using the "Select Image" button or the user can select the "Capture Image" to capture a new image using the lens-free microscope.

Next, the user has the ability to run the machine-learning algorithm on the holographic image that is captured. This may be initiated by depressing the "Find Viability" button illustrated in FIG. 2B. The tablet interface either uses the auto-focusing algorithm described earlier, in which case the entire analysis can take 5-10 minutes to run for each test, depending on the number of yeast cells within the sample volume. Alternatively, a list of previously calculated optimal propagation distances ($z_2$ per-tile) can be used, in which case the entire processing takes less than 30 seconds to run on the tablet-PC. In the experiments conducted with the lens-free microscope, it was noticed that the optimal propagation distances are consistent from test-to-test when using the same batch of coverslips for the microfluidic sample holders; therefore the auto-focus algorithm was run only once, and applied the same optimal distances to later experiments using the same batch of sample holders. SVM-classified stained and unstained yeast cells, labelled using the red and green markers respectively, are then displayed to the user (other labels could also be employed). The user has the capability to digitally zoom within a given image and inspect each labelled cell. Through the same GUI, the user can observe the unstained cell concentration, total cell concentration, and the viability of each of the six tiles/sub-FOVs in three separate bar graphs. This "Full Results" screen is seen, for example, in FIG. 2C. Additionally, the average concentration and viability information along with the standard deviations within the tiles are all displayed to the user.

Results and Discussion

There are a large number of methods that can be used for quantifying the viability of yeast cells. One of the established methods of determining cell viability is exclusion staining. In this method, dead cells are stained, and after counting the number of stained and unstained cells, a number between 0% and 100% is used to indicate the cell viability of the sample. There are multiple exclusion stains used in industry to perform yeast viability testing. One commonly used stain is methylene blue, which is inexpensive, can be stored at room temperature, and has a relatively low toxicity to humans. However, conventional methylene blue exclusion testing methods suffer from (1) false positive results at longer exposure times, and (2) operator subjectivity, which is an important disadvantage compared to fluorescence-based staining methods (e.g., using a fluorescent based stain such as propidium iodide).

The lens-free microscope platform described herein does not suffer from these reported disadvantages of methylene blue because (1) it captures an image of the sample over a large field-of-view and volume (~4.5 µL) in less than ten (10) seconds, therefore, reducing false positives, and (2) the machine-learning algorithm eliminates operator subjectivity. For these reasons, methylene blue provides a very good staining method for the lens-free microscope platform due to its more practical and cost-effective nature.

The automated yeast viability and concentration results obtained using methylene blue in the lens-free computational imaging system were compared with manual measurements of viability and concentration based on the fluorescence staining of dead cells using propidium iodide. These two methods were compared at various levels of cell viability and concentrations.

Each sample under test was divided into two sub-samples of equal volume, staining one with methylene blue and the other with propidium iodide. For each test, four to five 10× objective lens (NA=0.3) images of the propidium iodide stained samples were captured and manually labelled using benchtop fluorescence microscopy. A single lens-free image of the methylene blue sample was captured via the AYAP microscope device described herein. As described previously, AYAP divides the large FOV into six tiles and processes each tile independently. In the experiments it was found that when using the same batch of cover slips for the sample holder, the optimal propagation distances are consistent from sample holder to sample holder, eliminating the need for repeated digital auto-focusing, which makes the total analysis time for each sample less than thirty (30) seconds, even using a modest tablet-PC for computations.

Figure 7A:
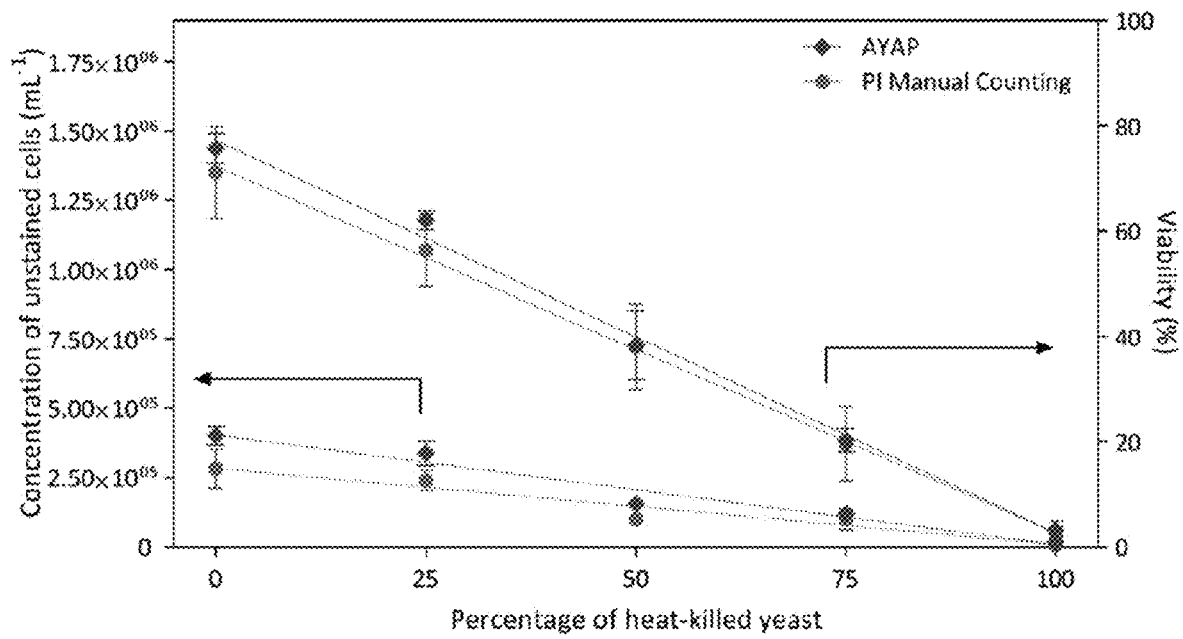
FIG. 7A illustrates a graph of concentration (left side) and cell viability (right side) measured by the AYAP system as compared to propidium iodide manual-based counting for yeast cells. The viability of the yeast cells was varied by mixing heat-killed yeast cells with the original yeast solution at different ratios.

In the experiments, viability of the yeast cells was varied by mixing different ratios of heat-killed yeast with the original yeast solution, and linear regression analysis was performed for each method (i.e., AYAP using methylene blue vs. benchtop fluorescence microscopy using propidium iodide), the results of which are summarized in FIG. 7A and Table 1 below.

TABLE 1

| | PI Manual counting | | AYAP | |
|---|---|---|---|---|
| % Heat-Killed Yeast | # of 10x images | Total # of cells identified | # of tiles (single FOV) | Total # of cells identified |
| 0% | 5 | 418 | 6 | 1886 |
| 25% | 5 | 457 | 6 | 1834 |
| 50% | 4 | 229 | 6 | 1448 |
| 75% | 5 | 538 | 6 | 1942 |
| 100% | 5 | 361 | 6 | 1578 |
| Linear Regression Viability | Slope $-0.6977 \pm 0.01508$ | Y-Intercept $72.34 \pm 0.9237$ | Slope $-0.7470 \pm 0.03135$ | Y-Intercept $77.25 \pm 1.920$ |

TABLE 1-continued

| | PI Manual counting | | AYAP | |
|---|---|---|---|---|
| % Heat-Killed Yeast | # of 10x images | Total # of cells identified | # of tiles (single FOV) | Total # of cells identified |
| Concentration of unstained cells | −2751 ± 417.1 | 282876 ± 25543 | −3956 ± 457.4 | 403343 ± 28009 |

These results show that the AYAP measurements agree very well with the gold-standard fluorescence-based exclusion staining method. The slopes and Y-intercepts are also summarized in Table 1, which further illustrate the similarity of the results of these two methods.

Figure 7B:
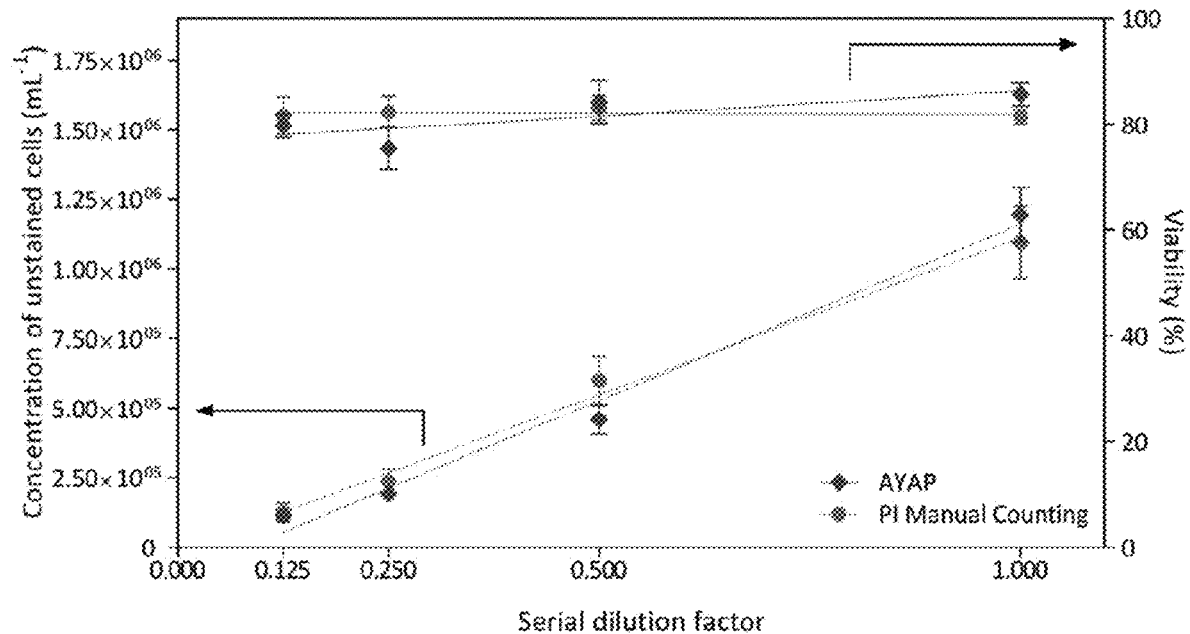
FIG. 7B illustrates a graph of concentration (left side) and cell viability (right side) measured by the AYAP system as compared to propidium iodide manual-based counting. Yeast cell concentration was varied through serial dilution.

In order to test the performance of AYAP at various yeast concentrations, serial dilution was performed and analyzed using linear regression. FIG. 7B and Table 2 below summarize the results.

TABLE 2

| | PI Manual counting | | AYAP | |
|---|---|---|---|---|
| Serial Dilution Factor | # of 10x images | Total # of cells identified | # of tiles (single FOV) | Total # of cells identified |
| 1.000 | 5 | 1439 | 6 | 4975 |
| 0.500 | 5 | 775 | 6 | 2081 |
| 0.250 | 5 | 304 | 6 | 878 |
| 0.125 | 5 | 166 | 6 | 518 |
| Linear Regression | Slope | Y-Intercept | Slope | Y-Intercept |
| Viability | −0.4331 ± 1.310 | 82.39 ± 0.7548 | 9.464 ± 5.238 | 76.90 ± 3.018 |
| Concentration of unstained cells | 1127000 ± 66950 | −14190 ± 38580 | 1265000 ± 101100 | −104000 ± 58240 |

Once again, AYAP measurements agree well with the fluorescence-based exclusion stain within a concentration range between approximately $1.4 \times 10^5$ and $1.4 \times 10^6$ cells/mL. Above this concentration range, cell overlap and clumps increase, leading to measurement and cell counting inaccuracies. Below this concentration range, on the other hand, the variability in concentration measurements due to statistical counting error increases, which is also shared by other microscopy based cell counting schemes due to the low number of cells per imaging FOV. Similarly, existing hemocytometers that are commonly used for laboratory and industrial applications claim accurate measurements between a minimum concentration of $\sim 2.5 \times 10^5$ cells/mL and a maximum concentration of $\sim 8 \times 10^6$ cells/mL,[45] and samples with larger concentration of cells are diluted. For example, for fermentation applications, the yeast sample is typically diluted by a factor of 10 to 1,000, prior to manual counting with a hemocytometer. Therefore, the dynamic range of the cell densities of the AYAP system is quite relevant for various cell counting applications.

These results illustrate that the viability percentages and concentrations measured using the AYAP microscope system are in close agreement to the gold-standard fluorescent staining method. The small differences between the two methods may be attributed to a few factors: (1) the channel height of our microfluidic sample holder or chamber may slightly vary from test to test leading to changes in the sample volume, which may cause the comparisons to have some systematic error; and (2) the machine-learning algorithm currently ignores cell clumps, whereas in the manual counting results for the fluorescent stain, the cells within the clumps were counted.

Figure 7C:
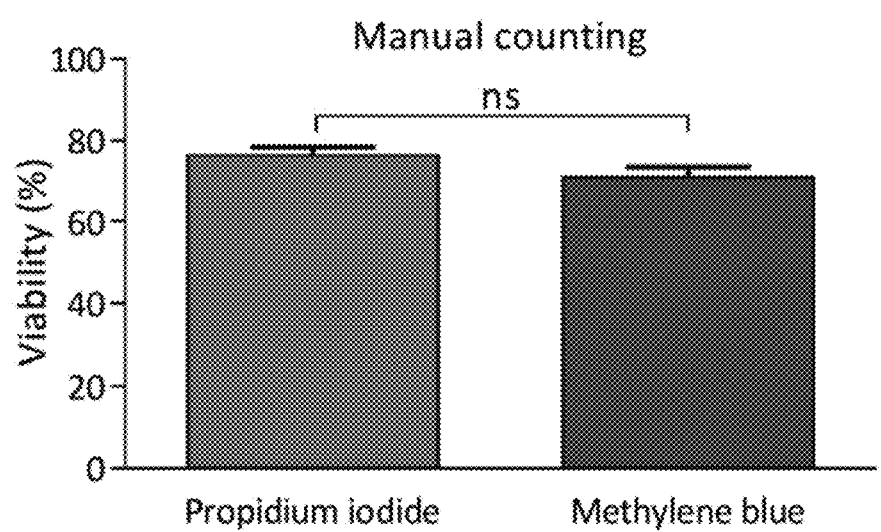
FIG. 7C illustrates a graph of viability % for the manual counting of cells stained with propidium iodide and methylene blue. Dry Active Distiller's yeast cells were manually counted and labelled as stained/unstained using a benchtop microscope. No statistically significant difference was observed between the two staining methods. Mann-Whitney test (non-parametric method, N=3) was used as the statistical analysis method. P<0.05 was considered as a statistically significant difference.

In addition to these comparisons between AYAP and fluorescence based standard exclusion method, a control experiment was performed to compare the viability percentages obtained from propidium iodide manual counting and methylene blue manual counting; both using a standard benchtop microscope to better understand and only focus on the differences between the two stains, everything else being same. For this experiment, the rehydrated yeast sample was divided into six samples of equal volume. Three samples were stained via propidium iodide and three samples were stained via methylene blue. Five different 10x objective lens images were captured from each sample (fluorescence and bright-field for propidium iodide and methylene blue, respectively) and manually labelled. As seen in the graph of FIG. 7C, a Mann-Whitney test was used as the statistical analysis method and no significant difference was observed between the viability percentages of these two staining methods.

Notably, the AYAP's design is cost-effective and field-portable as it approximately weighs 70 grams (excluding the tablet-PC) and has dimensions of 4×4×12 cm. Furthermore, the viability stain used in our platform, methylene blue, is commercially available and does not require special storage conditions, making it especially appealing for field use. Furthermore, the platform allows for rapid assessment of yeast viability and concentration: it performs automatic labelling in 5-10 minutes when using auto-focusing mode and in <30 seconds in cases where auto-focusing is not needed (i.e., prior auto-focus settings that are stored are re-used). These processing times can be further improved by using more powerful tablet-PCs or laptops. In fact, to better put these computation times into perspective, the process of manual counting of some of our more confluent samples took more than an hour by lateral scanning using a benchtop microscope with a 10x objective lens.

Figure 8:
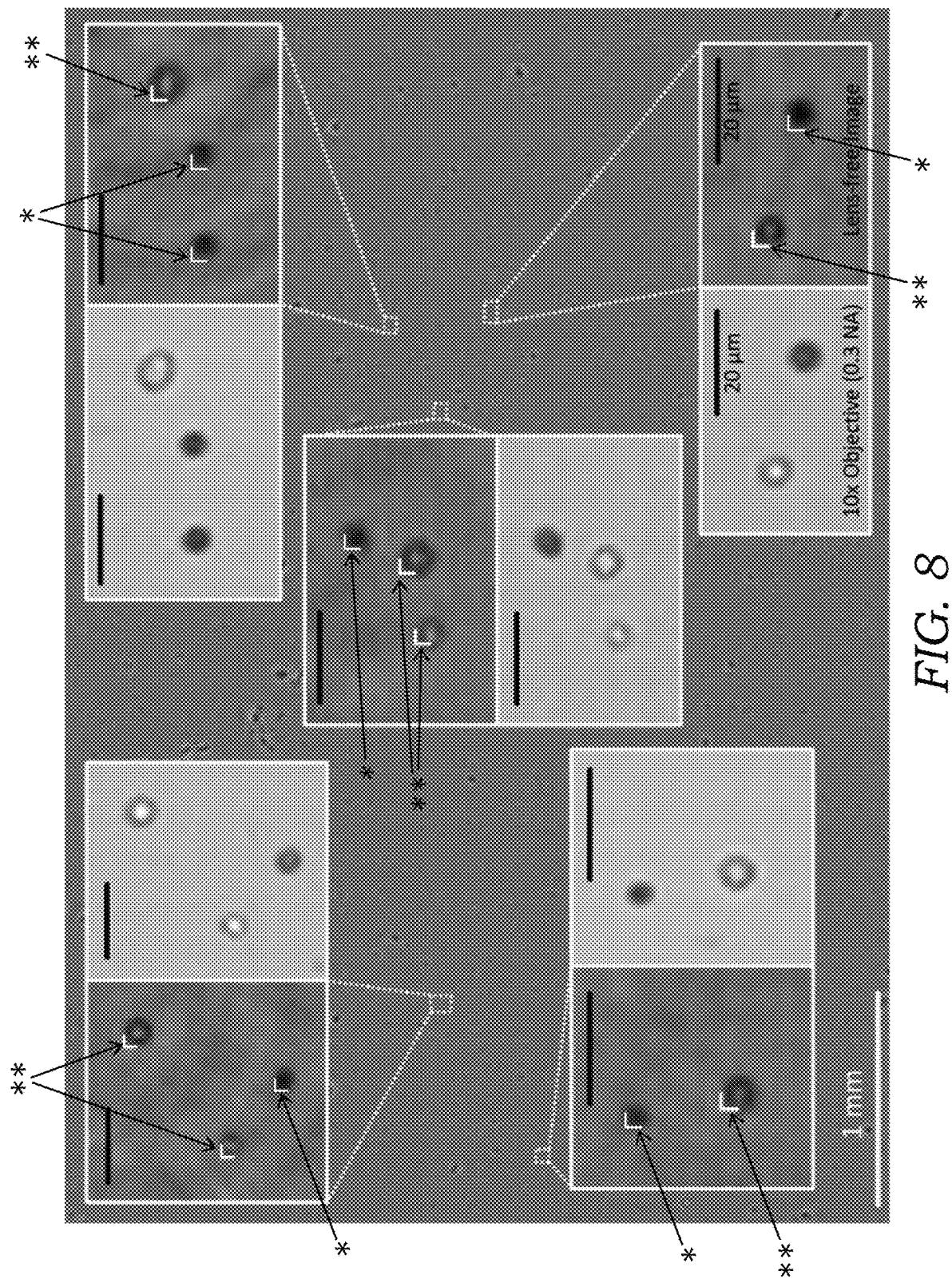
FIG. 8 illustrates a full field-of-view (FOV) image reconstruction and cell classification using AYAP system described herein. A lens-free amplitude image of a yeast sample stained with methylene blue is shown. The total area processed in a single hologram is ~22.5 mm$^2$. This FOV is approximately ten (10) times larger than the FOV of a typical 10× objective lens. Zoomed-in regions of the lens-free amplitude image are shown as insets. A 10× objective lens (0.3 NA) comparison image is shown next to each zoomed-in lens-free amplitude image. The marking (*) indicates a stained classification and the marking (**) indicates an unstained classification made by the machine-learning algorithm. The scale bars in the zoomed-in regions indicate a 20 μm length.

AYAP achieves accurate yeast viability and concentration analysis because the on-chip nature of the microscopy platform allows imaging of a large FOV of $\sim 22.5$ mm$^2$, which is more than an order of magnitude larger than the FOV of a typical 10x objective lens (1-2 mm$^2$), and therefore it permits the analysis of a significantly larger number of cells in a short amount of time. FIG. 8 illustrates, for example, a full FOV reconstructed image along with cell classifications using the system described herein.

Furthermore, the large imaging FOV is captured in less than ten (10) seconds, limiting the number of false positives associated with staining methods that expose cells to toxic environments. Finally, operator/user subjectivity is also eliminated in the system by using a machine-learning based statistical cell classification algorithm running on a tablet-PC.

While embodiments of the present invention have been shown and described, various modifications may be made without departing from the scope of the present invention. The invention, therefore, should not be limited except to the following claims and their equivalents.

What is claimed is:

1. A method for automatically analyzing yeast cell viability in a stained sample comprising:
   loading the stained sample in a portable, lens-free microscopy device that comprises a housing containing a light source at one end, and an image sensor disposed at another end of the housing, wherein a stained sample is disposed on the image sensor or a sample holder disposed adjacent to the image sensor;
   illuminating the stained sample with the light source and capturing a hologram image of the stained sample with the image sensor;
   transferring the captured hologram image to a computing device operatively connected to the lens-free microscopy device, the computing device having image processing software loaded therein for automatically analyzing yeast cell viability; and
   wherein the image processing software automatically analyzes yeast cell viability by (i) dividing the full hologram image field-of-view into a plurality of smaller tiled field-of-views, (ii) back-propagating the tiled field-of-views to a plurality of distances ($z_2$) from the image sensor, (iii) identifying yeast cell candidates at each $z_2$ distance and inputting yeast cell candidates into a pre-trained machine learning model to generate a mean classification score for the tiled field-of-views as well as classifying the yeast cell candidates as stained or unstained by classification score; (iv) selecting, for each tiled field-of-view, the distance $z_2$ with the largest mean classification score; (v) identifying the stained and unstained yeast cells in the selected tiles from (iv) for the full hologram image field-of-view.

2. The method of claim 1, wherein the image processing software outputs for display on the computing device a viability percentage for the full hologram image field-of-view or a sub-field-of-view.

3. The method of claim 1, wherein the image processing software outputs for display on the computing device one or more of stained concentration, unstained concentration, and total yeast cell concentration.

4. The method of claim 1, wherein the full hologram image field-of-view is divided into smaller tiled field-of-views that are processed in parallel or sequentially.

5. The method of claim 1, wherein the machine learning model utilizes one or more spatial features of each yeast cell candidate selected from the group consisting of yeast cell candidate's area, perimeter or circumference, maximum pixel value on a phase image, maximum pixel value on an amplitude image, minimum pixel value on the phase image, minimum pixel value on the amplitude image, mean pixel value on the phase image, mean pixel value on the amplitude image, standard deviation of pixel values on the phase image, and the standard deviation of pixel values on the amplitude image.

6. The method of claim 1, wherein the computing device comprises one of a desktop computer, laptop computer, tablet computer, or mobile phone.

7. The method of claim 1, wherein identifying the stained and unstained yeast cells in the selected tiles from (iv) for the full hologram image field-of-view comprises removing stained and unstained yeast cells having a classification score below a threshold cutoff value.

8. The method of claim 1, wherein the image processing software labels stained and unstained yeast cells in a graphical user interface that is displayed on the computing device.

9. The method of claim 1, wherein the machine learning model comprises a Support Vector Machine (SVM) learning model.

10. A method for automatically analyzing yeast cell viability in a stained sample comprising:
    loading the stained sample in a portable, lens-free microscopy device that comprises a housing containing a light source at one end, and an image sensor disposed at another end of the housing, wherein a stained sample is disposed on the image sensor or a sample holder disposed adjacent to the image sensor;
    illuminating the stained sample with the light source and capturing a hologram image of the stained sample with the image sensor;
    transferring the captured hologram image to a computing device operatively connected to the lens-free microscopy device, the computing device having image processing software loaded therein for automatically analyzing yeast cell viability; and
    wherein the image processing software automatically analyzes yeast cell viability by (i) dividing the full hologram image field-of-view into a plurality of smaller tiled field-of-views, (ii) back-propagating each of the tiled field-of-views to pre-stored distances ($z_2$) from the image sensor obtained in an auto-focus operation, (iii) inputting yeast cell candidates from the tiled field-of-views into a pre-trained machine learning model to generate classification scores for the yeast cell candidates, (iv) identifying the stained and unstained yeast cells in the tiled field-of-views for the full hologram image field-of-view based on the classification scores.

11. The method of claim 10, wherein the image processing software outputs for display on the computing device a viability percentage for the full hologram image field-of-view or a sub-field-of-view.

12. The method of claim 10, wherein the image processing software outputs for display on the computing device one or more of stained concentration, unstained concentration, and total yeast cell concentration.

13. The method of claim 10, wherein the full hologram image field-of-view is divided smaller tiled field-of-views that are processed in parallel or sequentially.

14. The method of claim 10, wherein the machine learning model utilizes one or more spatial features of each yeast cell candidate selected from the group consisting of yeast cell candidate's area, perimeter or circumference, maximum pixel value on a phase image, maximum pixel value on an amplitude image, minimum pixel value on the phase image, minimum pixel value on the amplitude image, mean pixel value on the phase image, mean pixel value on the amplitude image, standard deviation of pixel values on the phase image, and the standard deviation of pixel values on the amplitude image.

15. The method of claim 10, wherein the computing device comprises one of a desktop computer, laptop computer, tablet computer, or mobile phone.

16. The method of claim 10, wherein identifying the stained and unstained yeast cells in the tiled field-of-views for the full hologram image field-of-view comprises removing stained and unstained yeast cells having a classification score below a threshold cutoff value.

17. The method of claim 10, wherein the image processing software labels stained and unstained yeast cells in a graphical user interface that is displayed on the computing device.

18. The method of claim 10, wherein the machine learning model comprises a Support Vector Machine learning model.

* * * * *